United States Patent
Lamy

(10) Patent No.: US 12,533,812 B2
(45) Date of Patent: Jan. 27, 2026

(54) CO-HANDLING ROBOT HAVING A MIXED-FORCE CONTROL LAW PROVIDING HIGH EFFECTOR SENSITIVITY AND ENABLING INTERACTION WITH THE BODY OF THE ROBOT

(71) Applicant: COMMISSARIAT A L'ENERGIE ATOMIQUE ET AUX ENERGIES ALTERNATIVES, Paris (FR)

(72) Inventor: Xavier Lamy, Gif sur Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 289 days.

(21) Appl. No.: 18/257,806

(22) PCT Filed: Dec. 17, 2021

(86) PCT No.: PCT/EP2021/086585
§ 371 (c)(1),
(2) Date: Jun. 15, 2023

(87) PCT Pub. No.: WO2022/129566
PCT Pub. Date: Jun. 23, 2022

(65) Prior Publication Data
US 2024/0033929 A1    Feb. 1, 2024

(30) Foreign Application Priority Data
Dec. 18, 2020    (FR) ..................... 20 13615

(51) Int. Cl.
*B25J 13/02* (2006.01)
*B25J 9/00* (2006.01)
(Continued)

(52) U.S. Cl.
CPC ............. *B25J 9/1689* (2013.01); *B25J 9/163* (2013.01); *B25J 9/1633* (2013.01); *B25J 13/02* (2013.01); *B25J 13/085* (2013.01); *B25J 13/088* (2013.01)

(58) Field of Classification Search
CPC ........ B25J 9/1689; B25J 9/163; B25J 9/1633; B25J 13/02; B25J 13/085; B25J 13/088;
(Continued)

(56) References Cited

U.S. PATENT DOCUMENTS

2015/0290809 A1    10/2015    Nakagawa et al.

FOREIGN PATENT DOCUMENTS

WO    WO 2010/097459 A1    9/2010
WO    WO 2014/161796 A1    10/2014
(Continued)

OTHER PUBLICATIONS

Xavier Lamy, Human force amplification with industrial robot: study of dynamic limitations, Oct. 2010, The 2010 IEEE/RSJ International Conference on Intelligent Robots and Systems (Year: 2010).*

(Continued)

*Primary Examiner* — Adam R Mott
*Assistant Examiner* — Heather J Keniry
(74) *Attorney, Agent, or Firm* — Oblon, McClelland, Maier & Neustadt, L.L.P.

(57) ABSTRACT

A co-handling robot has a mixed-forced control law providing high effector sensitivity and enabling interaction with the body of the robot. A multi-axis force sensor is carefully positioned between the end member (flange) of an industrial co-handling robot and the tool supported thereby. A modified increased force control law is implemented in the robot controller by introducing a saturation function.

11 Claims, 2 Drawing Sheets

(51) Int. Cl.
  *B25J 9/16* (2006.01)
  *B25J 13/08* (2006.01)
(58) Field of Classification Search
  CPC .............. B25J 9/1641; B25J 9/0081; G05B
       2219/39529; G05B 2219/41411; G05B
       19/423
  See application file for complete search history.

(56) References Cited

FOREIGN PATENT DOCUMENTS

| WO | WO 2015/197333 A1 | 12/2015 |
|----|-------------------|---------|
| WO | WO 2016/000005 A1 | 1/2016  |

OTHER PUBLICATIONS

Monteiro, Anti-Windup Method for Fuzzy PD+I, PI and PID Controllers Applied in Brushless DC Motor Speed Control, Aug. 2011, IEEE Transactions on Industrial Electronics ( vol. 59, Issue: 3, Mar. 2012) (Year: 2011).*

International Search Report issued Apr. 12, 2022 in PCT/EP2021/086585, filed on Dec. 17, 2021, 2 pages.

Preliminary French Search Report with English translation of search categories dated Aug. 24, 2021 in French Application 2013615 filed on Dec. 18, 2020 (2 page).

Lamy et al., Human force amplification with industrial robot: study of dynamic limitations, The 2010 IEEE/RSJ International Conference on Intelligent Robots and Systems, 2010, 8 pages.

Baetica, A., "Integrator windup and PID controller design", CDS Caltech, 2015, 26 pages.

Torstensson, E., "Comparison of Schemes for Windup Protection", ISSN 0280-5316, ISRN LUTFD2/TFRT-5915-SE, Lund University, Department of Automatic Control, 2013, 61 pages.

Rooks, B., "The harmonious robot", Industrial Robot: An International Journal, 2006, 6 pages.

Hamon et al., "New Dry Friction Model with Load- and Velocity-Dependence and Dynamic Identification of Multi-DOF Robots", IEEE International Conference on Robotics and Automation Shanghai International Conference Center, 2011, 8 pages.

Newman et al., "Stable Interaction Control and Coulomb Friction Compensation Using Natural Admittance Control", Journal of Robotic Systems 11(1), 1994, 9 pages.

Newman, W.S. "Stability and Performance Limits of Interaction Controllers", Journal of Dynamic Systems, Measurement, and Control, vol. 114, 1992, 8 pages.

Hogan, N. "Controlling Impedance at the Man/Machine Interface", IEEE, 1989, 6 pages.

Geffard et al., "On the Use of a Base Force /Torque Sensor in Teleoperation", Proceedings of the 2000 IEEE International Conference on Robotics & Automation, 2000, 7 pages.

* cited by examiner

CO-HANDLING ROBOT HAVING A MIXED-FORCE CONTROL LAW PROVIDING HIGH EFFECTOR SENSITIVITY AND ENABLING INTERACTION WITH THE BODY OF THE ROBOT

TECHNICAL FIELD

The present invention relates to the field of robotics, and more particularly to the physical human-robot interaction (pHRI) employed by co-handling robots.

In general, pHRI is the act of allowing a human operator to enter the work zone of a robot and of allowing the one to interact directly and physically with the other.

The invention relates more particularly to a force-increasing control law for a co-handling robot.

PRIOR ART

In the field of robotics, there are various systems that enable operators to be assisted in their work.

In order to handle objects remotely and carry out arduous tasks, there are first of all systems referred to as remote-operation systems. Such systems generally consist of a controlling arm and of a controlled arm which are coupled to one another.

However, these are systems that are complex, both in their design and in their use. Accordingly, they prove expensive and difficult to master. In general, the productivity obtained with the systems is inferior to that obtained by operating directly on a component, bare handed or via tools, in order to perform the task.

To assist the operator in performing a complex and/or arduous task while at the same time maintaining a system that is simpler than the remote-operation systems, systems referred to as co-handling systems have been developed. These systems are generally made up of a co-handling robot or cobot which performs the task that is to be accomplished using a tool and which comprises a guidance member that allows a human operator to control the movements of said co-handling robot via said guidance member.

Co-handling thus allows the tool to be manipulated jointly by the robot and the operator so that the operator is thus assisted in executing the task that is to be accomplished.

More generally, this mode of interaction between the human and the robot makes it possible to provide a number of functionalities for assisting with the actions, such as by compensating for the weight of the tool, applying programmable mechanical constraints and increasing the force.

Co-handling thus allows various learning/programming functions to be performed in situ by leading the robot through the points, movements and/or forces involved in a task that is then to be performed autonomously by the same robot thereafter.

The suitability of a robot for co-handling is dependent mainly on its sensitivity to the forces applied by the operator and its environment to its terminal end element or member that bears the tool or a gripper. The quality of the co-handling as felt by the operator is very strongly connected with the idea of mechanical transparency achieved by the robotic system (the robot mechanism, sensors and actuators subjected to the control law).

The transparency of a robotic system qualifies its ability to move in the directions free of constraints while minimizing the force of interaction with the operator and/or its environment.

A system that exhibits perfect transparency is capable of following the movement imposed on the tool by the operator in the constraint space without offering any resistance to this movement: no impediment attributable to the robot is then perceived by the operator.

Robot systems capable of allowing co-handling can be categorized into three separate categories.

The first is concerned with mechanically transparent jointed systems: the mechanical design of the actuators allows both good transmission of force from the motor to the segments and the terminal member, and from the segments and the terminal member to the motors. Outside of any constraints there might be on displacement, the control law involves just compensating for the weight of the robot and of the tool as experienced by the joints in order to allow transparent co-handling, as disclosed in publication [1] and in patent application WO2014161796A1.

The second category is that of systems comprising insufficiently transparent joints: the mechanical friction in the joints, including reduction gear and motors, transferred to the point of interaction with the operator during the course of movements lies above an arduousness threshold.

Finally, there are systems comprising irreversible joints: for a zero motor force, whatever the force applied to the robot by the operator, these joints lock up and no movement is possible. This is notably the case of the joints created with mechanical systems of the worm/wheel type with high reduction ratios.

The present invention is concerned only with the categories of systems that have insufficiently transparent and/or irreversible joints, which covers the majority of industrial robots currently on the market. Specifically, industrial robots have been designed first and foremost to optimize the precision/repeatability of positioning at the expense of the capacity for interaction with the human operator.

The inventor has thus sought to improve the co-handling of existing industrial robots comprising joints that are insufficiently mechanically transparent or irreversible.

The inventor has analyzed the various disadvantages/limitations of these existing robots and itemized all the solutions currently available.

First of all, the co-handling of the tool needs to be performed with a transparency that is better than that inherent to the mechanics, notably with greatly reduced joint friction. In order to exceed the mechanical limit on transparency in systems that are insufficiently transparent, a first solution consists in modeling the friction forces of the joints in order to add compensation for this to the actuator control law.

This solution is not generally entirely satisfactory on current industrial robots because the friction models are dependent on parameters that vary greatly with joint lubrication, temperature and wear. Also, the variation in friction is abrupt and very much non-linear around zero speed. Compensation for friction is therefore inoperative for precise or slow movements, as is evident from publication [2].

Also, the robotic system implemented needs to remain sensitive across the entire robot body, although with lesser sensitivity than it needs to have at the tool.

For systems having insufficiently transparent or irreversible joints, one solution is to install a force sensor between the terminal end segment or member and the tool, and which is able to measure the six components of the loading pattern (three force components and three torques). The predicted weight of the tool is subtracted beforehand from the force measurement. A closed-loop feedback control law for the actuators to keep this force measurement at zero is then implemented in the robot control. This allows the robotic system to move continuously in such a way as to cancel the force of interaction of the operator with the robot at each instant. The internal friction forces of the joints are thus rejected, whatever their nature, without needing any form of prediction calculation: [3].

This solution therefore, according to the implementation of the control law, allows perfect rejection of the friction forces. By contrast, it is unable to overcome the effect of the mechanical inertia of the robot: [4].

Specifically, a control law, associated with the gain adjustment thereof, will be qualified as passive [5] when the robotic system being controlled is stable in its interaction with any mechanically passive environment and with the human operator (who may themselves be considered as being passive [6]). Now, it has been shown theoretically, for simple correctors, that an adjustment that compensates too greatly for the inertia of the robot will no longer be passive and notably that there will be instabilities in contact with highly rigid environments or with tools having high inertia.

Moreover, the chief limitation of this solution of measuring the force on the terminal end element is that it prevents any interaction between the robot body and its environment. Specifically, feedback control indiscriminately rejects friction as well as all the forces of interaction upstream of the force measuring sensor, because these are not measured. This may inadvertently, when the operator is concentrating mainly on the movements of the tools, lead to situations in which the robot body applies considerable and potentially destructive forces to elements or other operators present in the workspace.

Another limitation of this solution is that it is difficult to master the robot reconfiguration movements in the close vicinity of the singular configurations of the robot because the projection of the forces measured on certain joints is then zero or very low. For the same reason, in the case of robots with redundant kinematics, the internal movements of the robot, which do not cause any displacement of the terminal member (terminal end segment), cannot be controlled by co-handling of the tool alone: for an anthropomorphic arm with 7 degrees of freedom, the operator is unable to control the position of the elbow during the co-handling task without interacting with the robot body.

Moreover, robotic systems with mechanically insufficiently transparent or irreversible joints need to remain sensitive over the entire body of the robot, even if this means lower sensitivity at the tool.

To achieve this, one solution is to cover the surfaces of the segments of the robot body with a force-sensitive layer.

Patent application WO2016/000005A1 proposes a solution of covering it with a skin whereby when the robot body comes into contact with an element of the workspace beyond the detection threshold of the skin, a signal is transmitted to the robot which halts the movement until contact disappears. This generally entails disengaging the robot using some other means, such as the pendant.

Certain more highly evolved skins, such as the one described in WO2010097459A1, make it possible to determine the position of contact and the intensity thereof, so that only those components of the movement that are in the directions of contact are halted and the others are left free. This allows better continuity of the co-handling.

The disadvantage with the use of a skin is that the skin, by definition, needs to be made to suit the specific geometry of each robot. The other disadvantage is that it does not allow the operator to co-handle the robot body, with their second hand for example, even though being able to do so would be practical for controlling the configuration of the robot during co-handling in the vicinity of or through the kinematic singularities of the robot.

An alternative solution for having good sensitivity across the entire robot body is to fit a force sensor, which measures the six components of the loading pattern (three force components and three torques) between the robot base and its plinth. Thus, the forces applied to the robot body and the tool are indeed measured by the sensor in the base. It is sufficient to reuse the same law as for a force sensor positioned on the terminal member, with the difference that it is then necessary to subtract from the measurement the prediction of the dynamic loading pattern of the robot reduced to the sensor in the base, as the full gravity model may suffice for slow movements, as described in publication [7] or US2015/0290809A1.

The disadvantage with this solution is that the weight of the robot is, in practice, far greater than the forces applied by the operator, therefore necessitating a load sensor of far higher caliber with a far stricter requirement on the precision of the measurement (noise, linearity and drift) than is needed for a force sensor on the terminal member of the robot.

Another disadvantage of positioning a force sensor between the base of the robot and the plinth thereof is that the seating of the robot needs to be particularly well controlled when the robot is installed, because otherwise errors will be introduced into the prediction of the gravity loading pattern, and these will result in significant forces that disrupt the co-handling.

A final disadvantage affects two-handed co-handling, on distinct segments of the robot: force components internal to the kinematic chain of the robot do not have an overall resultant that can be measured by the force sensor at the base. This situation may arise in particular when the operator wishes to bend the robot elbow by jointly co-handling the arm and the forearm. This leads to disturbances in certain co-handling configurations.

Another alterative solution is to place joint torque sensors at the output of each robot joint, with one component per joint. This solution allows the system to be fully sensitive to the forces applied to all the segments of the robot, even in the event of two-handed co-handling: [8], [9].

The disadvantage with this solution is that it entails a new design of the robot joints, something which cannot be applied to industrial robots that already exist.

Finally, another alternative solution is to implement a force-increasing control law in the robot controller. This control law combines the measurement from a sensor positioned in such a way as to measure the force of a co-handling mechanical interface element on the tool, such as a handle, and the setpoint or a measurement (an indirect measurement) $\tau_m$ of the motor force of the actuators on the robot, for example the measurement of motor current or of actuator pressure.

Such control is notably described in WO2015/197333.

As explained in publication [10], the principle of force-increasing control is as follows: the loading pattern of the measurement from a sensor positioned in such a way as to measure the force of a co-handling mechanical interface element (a handle for example) on the tool is denoted $F_h$ and its projection into the motor space is denoted $\tau_h$. The vector of the setpoint, or a measurement (an indirect measurement) of the motor force of each actuator on the robot is denoted $\tau_m$. Thereafter, it is considered that the components of gravity that are known from the two measured/controlled parameters $F_h$ and cm have already been compensated for. The force of the workspace on the tool and the bodies of the robot (excluding the operator force $F_h$) are set as $F_t$ and its projection onto the same motor space is set as $\tau_t$, and the torque of the mechanical friction of the joints is set as $\tau_f$.

In equilibrium, the following mechanical relationship can be written:

$$\tau_m + \tau_t + \tau_h + \tau_f = 0 \qquad (1)$$

The force-increasing gain is then set as $g_f > 1$. $\tau_\epsilon$ is then defined as being the error torque in the motor space, and satisfies the following relationship: $\tau_\epsilon = -(\tau_m + \tau_h)/g_f + \tau_h$.

In the same way as for the force control described earlier, closed-loop feedback control is then performed on the robot actuator setpoint to keep the error torque at zero. In equilibrium then:

$$0 = -(-\tau_m + \tau_h)/g_f + \tau_h \qquad (2)$$

Substituting (1) into (2), gives:

$$\tau_h = -\frac{\tau_t + \tau_f}{g_f}$$

This equation shows:
on the one hand, that the objective of increasing the force is indeed met: excluding joint friction, the force that the tool applies to the workspace does indeed correspond to the force that the operator applies to the co-handling interface multiplied by the force-increasing gain;
on the other hand, that when the tool is not in contact ($\tau_t = 0$), the robot joint friction experienced by the operator is divided by this same gain.

Because there is no distinction between the forces on the tool and on the robot body, this control therefore offers the advantage of giving certain sensitivity on the robot body and of increasing the transparency at the co-handling interface.

A disadvantage with this solution is that there is a compromise to be reached regarding the force-increasing gain: this needs to be high enough to decrease the amount of friction experienced but if it is too high, then the sensitivity on the robot body is then too low.

The other disadvantage is that the operator may interact with the robot body or with the co-handling interface, but not with both at the same time: the displacement of the robot will then not correspond to the resultant of the two interaction forces, something which the operator finds somewhat unintuitive and difficult to control.

There is therefore a need to improve the co-handling of existing industrial robots comprising mechanically insufficiently transparent or irreversible joints, notably so as to alleviate the aforementioned disadvantages and more particularly those of a force-increasing control law.

It is an object of the invention to at least partially meet this need.

SUMMARY OF THE INVENTION

In order to do this, one of the aspects of the invention relates to a co-handling robot comprising:
a kinematic chain of mechanical elements comprising a proximal-end element forming a base of the robot and a distal-end element, the various elements being mounted with the ability to move relative to one another so that the distal-end element is able to move with respect to the proximal-end element;
a tool and/or a gripper, which is intended to be manipulated by a human operator, the tool and/or the gripper being connected to the distal-end element in such a way that it has the same degrees of freedom as the distal-end element;
means for controlling at least part of the first chain of elements, comprising:
actuators arranged on the chain to perform all the movements of the various elements of the chain relative to one another and/or to apply a force between them,
means for measuring the displacement of the elements with respect to one another,
where applicable, means for measuring the forces applied by the actuators, a single multiaxis force sensor, arranged between the distal-end element and the tool and/or the gripper, so as to measure forces applied to these,
a controller for controlling the actuators on the basis of the measurements taken by the means for measuring displacement and, where applicable, the means for measuring the forces applied by the actuators and by the measurements from the multiaxis force sensor, according to a control law implemented in the controller, said control law comprising:
a force-increasing loop configured to amplify, at the robot joints, forces applied by the operator to the tool and measured by the multiaxis force sensor, this being in respect of at least some of the degrees of freedom of the distal end, the force-increasing loop comprising a comparator to subtract, from the product of the integral gain Ki of the loop, the product of an anti-windup gain Kaw, and an integrator which receives the result from the comparator to supply the setpoint speeds for the various elements of the chain,
an internal speed loop with proportional gain Kv which receives the speed setpoint from the force-increasing loop to supply the non-saturation reference torques for the various actuators,
an internal speed loop saturation function, the saturation term $\tau_{sat}$ being chosen to be greater than or equal to the vector $\tau_{f0}$ of the dry friction coefficients of the actuators,
an anti-windup component fed back to the input of the integrator of the force-amplification loop, and obtained as the product of the force correction applied by the saturation and the gain Kaw so that as soon as saturation comes into effect, the integrator of the force-increasing loop interrupts its integration.

The relationship $Kaw = Kv^{-1}$ is preferably set.

As a further preference, the saturation term $\tau_{sat}$ is equal to the sum of the vector $\tau_{f0}$ plus twice the value of the uncertainty thereon.

The word "controller", here and in the context of the invention, is meant in the usual broad sense, namely a combination of hardware and software for programming and controlling a robot.

According to a first configuration, when the actuators can be controlled by force directly by the controller, the saturation function is applied directly at the output of the internal speed loop.

According to a second configuration, when the actuators cannot be directly controlled by force, but are controlled for example by a closed position or speed controller, the forces $\tau_m$ applied by the actuators are then measured and considered in the saturation calculation.

As a preference, the means for measuring the displacement of the elements with respect to one another comprise absolute position sensors, or even absolute multi-revolution sensors if they are placed directly at the output of the motors prior to a reduction stage.

The controller may be configured to implement an additional control law selected, for example, from control with programmable virtual mechanical constraints, control with cartesian or joint speed limits, control with restriction of the workspace, remote-operation control with or without force feedback. For controls with programmable virtual mechanical constraints, with cartesian or joint speed limits, or with restrictions of the workspace, reference may be made to the teachings of application WO2015/197333.

For remote-operation control with or without force feedback, a law described in [11] or [12] may be implemented.

Thus, the invention essentially consists in the judicious positioning of a multiaxis force sensor between the terminal member (flange) of a co-handling industrial robot and the tool that it bears and in modifying a force-increasing control law implemented in the controller of the robot by adding a saturation function.

The invention is thus able to alleviate the disadvantages of the force-increasing laws according to the prior art and therefore makes it possible to increase the sensitivity on the robot body and allows a human operator to interact jointly with the robot body and with a co-handling interface such as a tool supported by the terminal member of the robot.

In other words, the control according to the invention combines the sensitive force measurements of the multiaxis sensor to allow the robot to be displaced by manipulating the tool directly with greatly reduced forces (high level of transparency, as the robot joint mechanical friction is hidden), with, on the other hand, the force measurements or setpoints for the actuators, so as to ensure sensitivity to physical interactions with the entirety of the robot body that is less, but an improvement on [10].

Thus, it is possible for an operator easily to manipulate the tool supported by the robot without having to worry that the robot body will apply high forces if it inadvertently collides with an obstacle in the environment.

Should that happen, the control will respect the "natural" equilibrium of the forces: opposing forces will cancel each other out and the robot will stop without applying any more force to the obstacle than the operator is applying to the tool.

The invention affords numerous advantages, in addition to the co-handling function on an industrial robot, and which include:
- a significant reduction in the joint mechanical friction experienced by a human operator when directly co-handling the tool;
- sensitivity of the body of the robot to the forces of interaction with the operator and/or the workspace;
- "natural" equilibrium of forces respected, in the event of multiple joint interactions between the operator, the workspace, the robot body and the tool, even in the presence of internal force components;
- passivity of the interaction between the robot and its working environment as a result of the stability obtained on contact with any passive environment;
- no need to modify the mechanical architecture of the robot or the actuators thereof;
- no need to cover the robot body with an element that is sensitive to contact,
- absence of limitations on use in the proximity to or when passing through the mechanical singularities of the robot,
- the possibility of combining the control law with other additional control laws useful to co-handling (virtual constraints, speed limits and workspace limits, remote operation, etc.).

None of the solutions proposed in the prior art for controlling industrial co-handling robots is able to provide all of these advantages at the same time.

Another subject of the invention is the use of an industrial co-handling robot as described hereinabove as a robot to assist with a surgical intervention or as a robot for assembling or handling heavy loads, or as a lead-through programmed robot.

Further advantages and features of the invention will become better apparent from reading the detailed description of exemplary embodiments of the invention, which is given by way of nonlimiting illustration and with reference to the following figures.

DETAILED DESCRIPTION

Figure 1:
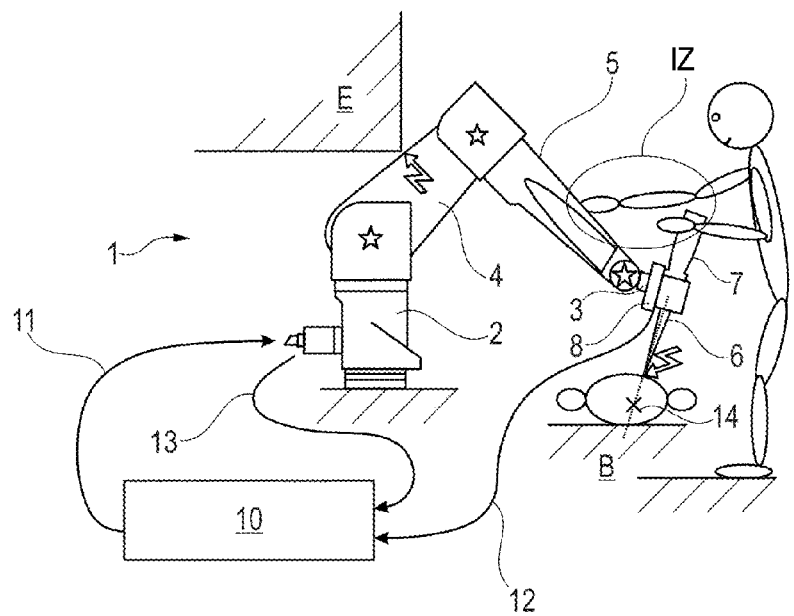
FIG. 1 is a schematic view of one example of an industrial co-handling robot with its controller, employed as a system for increasing the force applied by a human operator to a tool carried by the robot.

FIG. 1 illustrates an industrial co-handling robot 1 according to the invention, used as a system to assist with the manipulation of a tool.

In the example illustrated, the tool is a needle used for a surgical intervention by a surgeon in an operating room which constitutes the working environment of the robot 1. In this example illustrated, the co-handling robot 1 is controlled according to a mixed force control law, detailed hereinafter, that allows the human operator (the surgeon) to manipulate the tool jointly with the robot while compensating for the weight of the tool and the friction in the robot joints, while at the same time remaining sensitive to the interactions with the robot body.

This law is combined with an additional control law that applies a virtual guidance constraint on the tool (this is not detailed here in the context of the invention).

The co-handling robot 1 is a robot having a manipulator arm with six degrees of freedom.

Thus, the robot 1 comprises a kinematic chain of elements articulated to one another and which comprise a proximal-end element 2 that forms a base of the robot and a distal-end element 3 that forms a flange. It additionally comprises two elements 4, 5 or segments that are articulated to one another between the base 2 and the distal-end end 3.

The robot 1 additionally comprises a tool, which in the example illustrated is a needle 6, secured to a handle 7 that is to be manipulated by the human operator. The needle 6 and the handle 7 are connected to the distal-end element 3 (the flange) so as to have the same degrees of freedom as that element, namely six degrees of freedom with respect to the base 2.

Thus, the needle 6 can be moved in all directions in space in translation and in rotation relative to the base 2.

The operator may, in the interaction zone IZ, interact with the tool 6, 7 and/or with the body of the robot, notably the element 5 thereof.

The workspace may also interact with the tool 6 and/or with the body of the robot, notably with the element 4 thereof, on the occasion of deliberate or non-deliberate (unwanted) contacts with the operator.

In other words, there are two interaction ports installed directly on the robot, one via the robot body, particularly the elements 4, 5 thereof, and the other via the tool 6, 7.

The robot further comprises means for controlling the chain of elements, and therefore the tool 6, 7 that is connected to the distal-end element 3.

The control means first of all comprise a controller 10 which executes programs for controlling the main chain of elements of the robot in order to maintain coordination between the robot body and the tool 6, 7.

The control means also comprise actuators, not depicted, each arranged at one of the joints of the chain of elements so as to be able to cause one of the elements to move relative to the adjacent element of the joint concerned or so to apply a force between these elements. The controller 10 controls the various actuators, as indicated schematically by the arrow 11 in FIG. 1, so that the tool 6, 7 can be moved in a coordinated fashion relative to the base 2.

Furthermore, a multiaxis force sensor 8, preferably a six-axis sensor, is arranged between the distal-end element 3 and the tool 6, 7 so as to be able to generate, intended for the controller 10, signals indicative of the forces applied by the tool 6, 7 to the distal-end element 3, as symbolized by the arrow 12 in FIG. 1. The tool 6, 7 is thus connected to the distal-end element 3 via said multiaxis force sensor 8.

The control means further comprise means for measuring the displacements of the various elements and which here comprise a plurality of position sensors, not depicted, each one arranged at one of the joints of the main chain of elements so as to be able to generate, intended for the controller 10, signals indicative of the relative position of the two elements that make up the joint concerned, as symbolized by the arrow 13 in FIG. 1. The position sensors are absolute-position sensors.

The absolute-position sensors and the multiaxis force sensors 8 thus allow the controller 10 at any moment to measure the movements of the tool 6, 7 and of the robot body with respect to the base 2 and at any moment the forces applied to the tool 6, 7.

According to the invention, the controller 10 executes a program according to a control law detailed hereinafter which allows increased sensitivity to the forces applied to the tool 6, 7 by the operator or by their environment.

This control law may be combined with another additional control law not detailed herein, which in particular allows virtual constraints 14 to be applied to the displacements of the tool, in the case illustrated in FIG. 1, so as to guide the insertion of the needle 6 into the body of the patient B toward a zone of interest.

The load pattern for the force applied to the distal-end element 3 of the robot, as measured by the force sensor 8, minus the known weight of the tool 6, 7 and reduced to the center point S of the sensor frame of reference is denoted $W_{s,S} \in \mathbb{R}$, and the components of this are expressed in the base of the sensor frame of reference S.

$$W_{s,S} = \begin{bmatrix} F_{s,S} \\ M_{s,S} \end{bmatrix}$$

Where $F_{s,S} \in \mathbb{R}^3$ is the resultant and $M_{s,S} \in \mathbb{R}^3$ is the torque at the point S of the measured force, these being expressed in the frame of reference S.

The cartesian position of the frame of reference S expressed in the frame of reference E associated with the terminal member of the robot is denoted $X_{S,E} \in SE(3)$. Because the force sensor 8 is rigidly connected to the distal-end element 3, $X_{S,E}$ is constant and can be broken down into $R_{S,E} \in \mathbb{R}^{3 \times 3}$ the rotation matrix for the frame of reference S in the frame of reference E, and $T_{S,E} \in \mathbb{R}^3$, the position of the origin of the frame of reference S expressed in the frame of reference E.

This yields:

$$W_{s,E} = \begin{bmatrix} F_{s,E} \\ M_{s,E} \end{bmatrix} = \begin{bmatrix} R_{S,E} \cdot F_{t,S} \\ R_{S,E} \cdot M_{s,S} + T_{S,E} \times F_{s,E} \end{bmatrix}$$

the loading pattern for the force applied to the distal-end element 3 of the robot by the sensor 8 reduced to the center of and expressed in the frame of reference E.

The vector of the measurement of the position of the robot joint is denoted $q \in \mathbb{R}^N$, where N is the number of joints.

The vector of the measurement of the position of the robot actuators is denoted $\theta \in \mathbb{R}^P$, where $P \leq N$ is the number of robot joints.

For a given joint position q, the cartesian position of the frame of reference E associated with the terminal member of the robot, expressed in the frame of reference B of the base of the robot is denoted $X = X_{E,B}(q) \in SE(3)$. This position can be broken down into $R_{E,B} \in \mathbb{R}^{3 \times 3}$, the rotation matrix for the rotation of the frame of reference E in the frame of reference B, and $T_{E,B} \in \mathbb{R}^3$, the position of the origin of the frame of reference E expressed in the frame of reference B.

This yields:

$$W_s = W_{s,E/B} = \begin{bmatrix} F_{s,B} \\ M_{s,E/B} \end{bmatrix} = \begin{bmatrix} R_{E,B} \cdot F_{s,E} \\ R_{E,B} \cdot M_{s,E} \end{bmatrix}$$

the load pattern applied to the terminal member of the robot by the sensor reduced to the center of the frame of reference E, expressed in the frame of reference B.

The Jacobean matrix of the application $X_{E,B}(q)$ is denoted $J = J_{E,B}(q) \in \mathbb{R}^{6 \times N}$, such that:

$$\dot{X} = \begin{bmatrix} V \\ \omega \end{bmatrix} = \begin{bmatrix} V_{E,B} \\ \omega_{E,B} \end{bmatrix} = J \cdot \dot{q}$$

where $\dot{X} \in \mathbb{R}^6$ is the kinematic load pattern for the robot effector reduced to the center of the frame of reference E and expressed in the frame of reference B and which can be broken down into $V_{E,B} \in \mathbb{R}^3$, the speed of the origin of the frame of reference E expressed in the frame of reference B, and $\omega_{E,B} \in \mathbb{R}^3$, the rotation speed vector for the frame of reference E expressed in the frame of reference B.

The matrix for the reduction ratios from the actuator space to the joint space is denoted $G \in \mathbb{R}^{N \times P}$.

This then makes it possible to obtain $\tau_s \in \mathbb{R}^P$, the projection into the actuator space of $W_s$ the load pattern for the force applied to the terminal member by the sensor:

$$\tau_s = G^T \cdot J^T \cdot W_s$$

Figure 2:
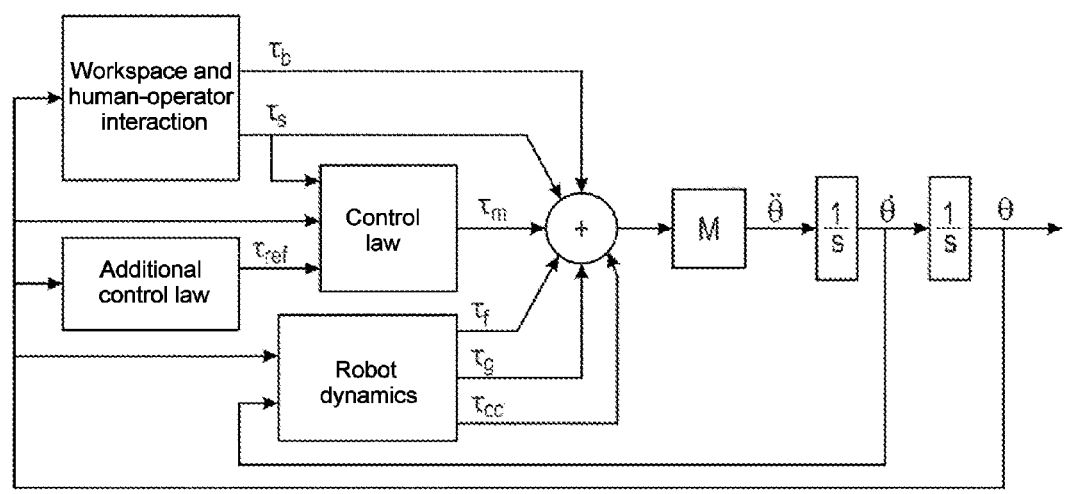
FIG. 2 is a diagram summarizing all of the forces applied to the system of FIG. 1.

All of the forces applied to the system will then be studied in the actuator space and these are summarized in the diagram of FIG. 2.

The vector of the forces applied by the operator and the workspace to the robot body projected into the actuator space is denoted $\tau_b \in \mathbb{R}^P$.

The vector of the forces produced by the actuators (measured or setpoint forces depending on the implementation) is denoted $\tau_m \in \mathbb{R}^P$.

The vector of the joint friction forces projected into the actuator space is denoted $\tau_f \in \mathbb{R}^P$.

The vector of the forces of gravity of the robot-tool system and projected into the actuator space is denoted $\tau_g \in \mathbb{R}^P$.

The vector of the centrifugal forces and Coriolis forces of the robot-tool system and projected into the actuator space is denoted $\tau_{cc} \in \mathbb{R}^P$.

The matrix for the inertia of the robot-tool system projected into the actuator space is denoted $M \in \mathbb{R}^{P \times P}$.

At equilibrium and at low speed ($\ddot{\theta}=0$, $\tau_{cc}=0$), the following relationship applies:

$$\tau_s + \tau_b + \tau_g + \tau_f + \tau_m = 0 \qquad (3)$$

Figure 3:
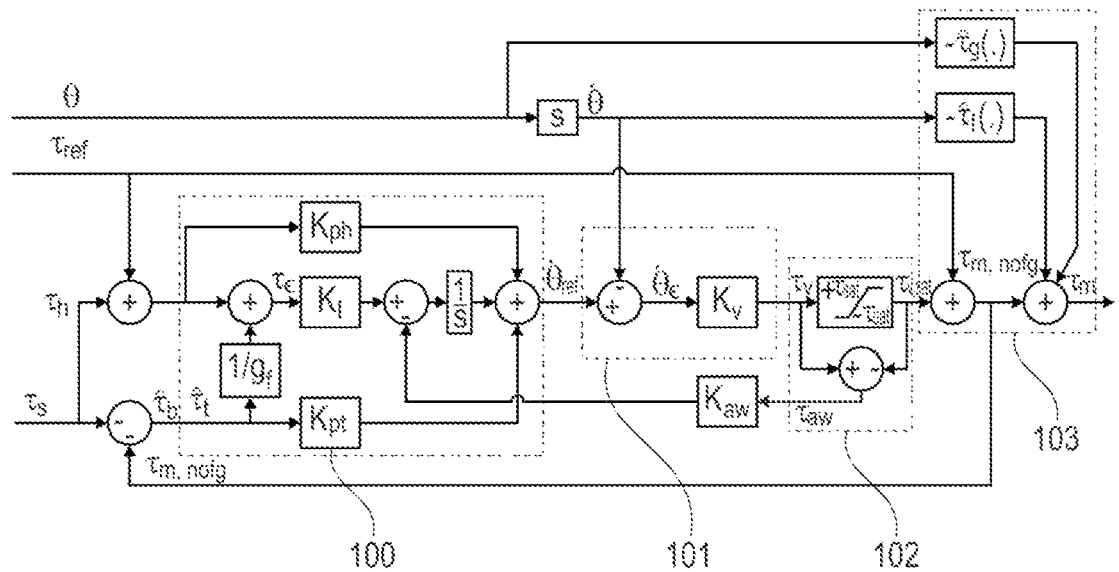
FIG. 3 illustrates the control law according to the invention as executed by the controller of the robot depicted in FIG. 1.

The mixed force control law according to the invention is shown in the diagram of FIG. 3.

The following loops are implemented in the controller 10:
- a force-increasing loop 100;
- an internal speed loop 101 which receives the speed setpoint from the force-increasing loop to supply the setpoint torques for the various actuators;
- an internal speed loop saturation function 102;
- an anticipation for the compensation of the model 103.

The various interactions between the loops are detailed hereinafter with reference to the robot actuators space.

The vector of the model of the forces of gravity of the robot-tool system, projected into the actuator space, is denoted $\hat{\tau}_g \in \mathbb{R}^P$.

The vector of the model of the joint friction forces projected into the actuator space is denoted $\hat{\tau}_f \in \mathbb{R}^P$. One example of a friction model in the actuator space alone may be:

$$\hat{\tau}_f = -\tau_{f0} \cdot a \tan(\dot{q}/\dot{q}_0) - B_f \dot{q}$$

where $\tau_{f0} \in \mathbb{R}^P$ represents the vector of the dry friction coefficients of the actuators, $\dot{q}_0 \in \mathbb{R}^6$ represents the nominal speed of application of the model, $B_f \in \mathbb{R}^P$ represents the damping in the actuators.

The following notations are introduced to simplify the connection with the force-amplification control as described in [10].

$\tau_h = \tau_s$ represents the force, projected into the actuator space, of the interaction port the sensitivity of which is to be increased, in our case the tool mounted on the force sensor.

$\hat{\tau}_t = \hat{\tau}_b$ represents the estimate of the force projected into the actuator space of the other interaction port the sensitivity of which is not increased, in this instance all of the external forces applied to the robot body.

Therefore: $\hat{\tau}_t = \hat{\tau}_m - \hat{\tau}_f - \hat{\tau}_g - \tau_s$ \qquad (4)

$g_f > 1$ represents the amplification factor of the force-increasing loop.

$K_i \in \mathbb{R}^P$ is the integral gain of the force-amplification loop. $K_i$ is inversely proportional to the apparent inertia of the system being controlled. The theoretical limit for setting this gain, and therefore on the achievable apparent inertia of the robot controlled in accordance with the passivity criteria, namely unconditional stability of the robot in interactions with any passive environment, is of the order of the mechanical inertia specific to the robot: [4].

The vector of the setpoint forces deriving from an optional additional control law not detailed here is denoted $\tau_{ref} \in \mathbb{R}^P$: this law may be a virtual constraint law, a speed limit law, a law limiting the workspace, or a remote operation law.

In equilibrium and outside of the saturation range, the integrator input will be zero, and the property of the force-amplification loop will therefore indeed be encountered:

$$\tau_h + \tau_{ref} + \hat{\tau}_t / g_f = 0 \qquad (5)$$

By substituting (3) and (4) into (5):

$$\tau_h + \tau_{ref} + (-\hat{\tau}_m - \hat{\tau}_f - \hat{\tau}_g - \tau_s)/g_f = 0$$

$$\tau_h + \tau_{ref} = -(\tau_b + \tau_f - \hat{\tau}_f + \tau_g - \hat{\tau}_g)/g_f$$

It is therefore indeed found that the friction, not compensated for by the model ($\tau_f - \hat{\tau}_f$), is indeed reduced by the force-amplification factor when the operator is manipulating only using the tool, which corresponds to $\tau_b = 0$, $\tau_{ref} = 0$ and $\hat{\tau}_g \approx \tau_g$.

$K_v \in \mathbb{R}^P$ represents the proportional gain of the internal speed loop 101. The purpose of the internal speed loop is to linearize the system notably with respect to dry friction, and this reduces the accumulation necessary in the integrator of the force-amplification loop and improves the rejection of friction, notably at the instant of the change in sign of the speed of the joints.

$\tau_{sat} \in \mathbb{R}^P$ is the saturation term for the speed loop 101. The saturation function makes it possible to limit the contribution of the force amplification to just the reduction of the dry friction and allow "natural" equilibrium of the forces when there is a joint interaction on the tool and on the body of the robot.

To do that, according to the invention, $\tau_{sat}$ is chosen to be of the order $\tau_{f0}$, and so for $|\tau_h| >> |\tau_{f0}|$, the control will always be saturated in equilibrium.

Equation (3) then becomes:

$$\tau_s + \tau_b \pm \tau_{sat} - \hat{\tau}_g - \hat{\tau}_f + \tau_f + \tau_g = 0$$

where $|\tau_h + \tau_b| = |\pm \tau_{sat} + \tau_f - \hat{\tau}_f + \tau_g - \hat{\tau}_g| << |\tau_h|$ The "natural" equilibrium of the forces is therefore indeed regained:

$$\tau_h \approx -\tau_b$$

$K_{aw} \in \mathbb{R}^P$ represents the anti-windup gain of the integrator of the force-increasing loop 100 necessary for the integrator to stop integrating as soon as saturation comes into force. It is advantageously chosen so that:

$$K_{aw} = K_v^{-1}$$

Finally, $K_{pt} \in \mathbb{R}^P$ and $K_{ph} \in \mathbb{R}^P$ are the proportional gains of the force-amplification loop, $\mathbb{R}$ corresponding to the aforementioned two interaction ports. Adjusting these makes it possible to optimize the stability and passband of the force-amplification loop, as specified in publication [10].

The force setpoint $\tau_m$ is obtained by adding the anticipation terms: $\tau_{ref}$ of the optional additional control law, $\hat{\tau}_f$ and $\hat{\tau}_g$ modeling friction and gravity.

The inventors implemented the force control law with the saturation function that has just been described in controllers for industrial robots from Staübli range TX2_90 and TX2_60L. The co-handling performance was proven. The functionalities involving virtual constraints, speed limits and limited workspace were successfully combined without loss of performance.

Figure 4:
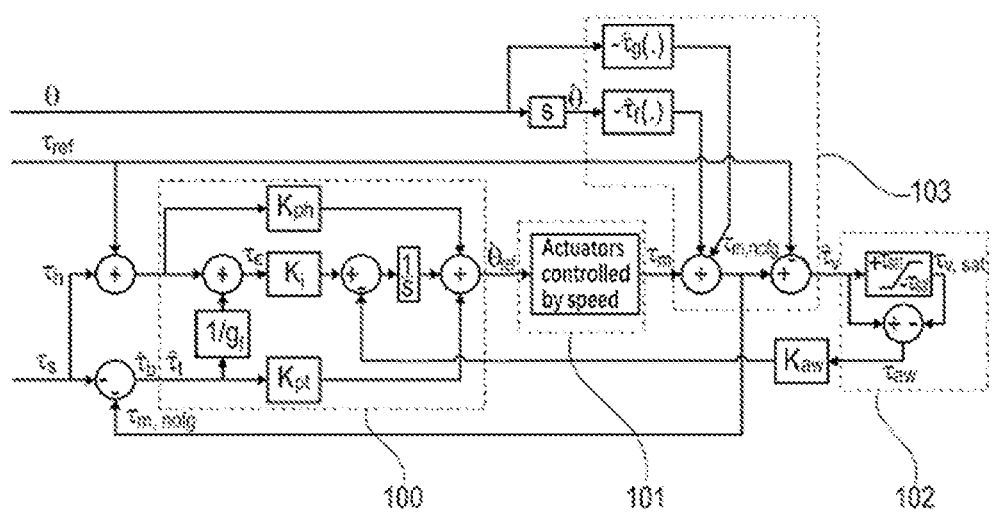
FIG. 4 illustrates a variant of the control law according to the invention.

A variation to the control law according to the invention is shown in the diagram of FIG. 4. This variation applies to actuators that cannot be directly controlled by force. These may for example be hydraulic or pneumatic actuators fitted with servo-valves.

Here, the speed setpoint $\dot{\theta}_{ref}$ at the output of the force-amplification loop 100 then directly controls the actuators, which therefore need to be equipped with the ability to measure the force $\tau_m$.

For a hydraulic actuator, the setpoint may be that of a servocontrolled hydraulic flow rate with actuator pressures measured.

As schematically indicated in FIG. 4, the measurement of force $\tau_m$ is thus used to calculate the estimate $\hat{\tau}_b$ of the forces on the robot body, on the one hand, and in the saturation and anti-windup $\tau_{aw}$ calculation on the other hand.

The invention is not limited to the examples which have just been described; features from the illustrated examples may notably be combined with one another in variants that have not been illustrated.

Other variants and improvements may be envisioned without in any way departing from the scope of the invention.

The actuators may advantageously comprise servomotors. In general, the actuators may comprise ironless DC motors, brushless motors, conventional DC motors, shape memory alloys, piezoelectric actuators, active polymers, pneumatic or hydraulic actuators. The actuators may even have brakes on one or more elements of the robot body. These brakes may thus be disk brakes, powder brakes or magnetorheological or electrorheological fluid brakes. The actuators may also comprise hybrid actuators which comprise both a motor and a brake or counter-actuating devices and/or variable-stiffness devices. When the actuators comprise reduction gear for example associated with motors, the reduction gear may be of any type and for example may be simple gearing or epicyclic gearing reduction motors, with one or more stages, reduction gear of the "Harmonic Drive" (registered trade name) type or ball-screw reduction gear or cable winch reduction gear. In place of reversible reduction gear, it is possible to have non-reversible reduction gear such as worm and wheel reduction gear.

LIST OF CITED REFERENCES

[1] B. Rooks, "*The harmonious robot*", Industrial Robot: An International Journal, vol. 33, no. % 12, pp. 125-130, 2006.

[2] P. Hamon, M. Gautier and P. Garrec, "*New dry friction model with load-and velocity-dependence and dynamic identification of multi-DOF robots*", IEEE International Conference on Robotics and Automation, pp. 1077-1084, 2011.

[3] W. S. Newman and Y. Zhang, "*Stable interaction control and coulomb friction compensation using natural admittance control*", Journal of Robotic Systems, vol. 11, n° % 11, pp. 3-11, 1994.

[4] W. S. Newman, "*Stability and performance limits of interaction controllers*", Journal of Dynamic Systems, Measurement, and Control, vol. 114, no. % 14, pp. 563-570, 1992.

[5] J. E. Colgate, "*The Control of Dynamically interacting Systems*", PhD Thesis, Massachusetts Institute of Technology, 1988.

[6] N. Hogan, "*Controlling impedance at the man/machine interface*", IEEE International Conference on Robotics and Automation, Proceedings, vol. 3, pp. 1626-1631, 1989.

[7] F. Geffard et al., "*On the use of a base force/torque sensor in teleoperation*", Proceedings 2000 ICRA. Millennium Conference. IEEE International Conference on Robotics and Automation. Symposia Proceedings, vol. 3, pp. 2677-2683, 2000.

[8] A. Albu-Schäeffer and C. Ott, "*A Unified Passivity Based Control Framework for Position, Torque and Impedance Control of Flexible Joint Robots*", The International Journal of Robotics Research, vol. 26, 2007.

[9] R. B. et al., "*The KUKA-DLR Lightweight Robot arm—a new reference platform for robotics research and manufacturing*", ISR 2010 (41st International Symposium on Robotics) and ROBOTIK 2010 (6th German Conference on Robotics), pp. 1-8, 2010.

[10] X. Lamy et al., "*Human force amplification with industrial robot: study of dynamic limitations*", IEEE/RSJ International Conference on Intelligent Robots and Systems (IROS)., 2010.

[11] K. Hashtrudi-Zaad and S. E. Salcudean, "*Analysis of Control Architectures for Teleoperation Systems with Impedance/Admittance Master and Slave Manipulators*", The International Journal of Robotic Research, vol. 20, no. % 16, pp. 419-445, 2001.

[12] A. Micaelli, "*Teléopération et télérobotique, chapitre 6, asservissement et lois de couplage en téléoperation* [Remote operation and remote robotics, chapter 6, feedback control and coupling laws for remote operation]", Hermés science, 2002.

The invention claimed is:

1. A co-handling robot comprising:
a kinematic chain of mechanical elements comprising a proximal-end element forming a base of the robot and a distal-end element, the elements being mounted with the ability to move relative to one another so that the distal-end element is able to move with respect to the proximal-end element;
a tool and/or a gripper, which is configured to be manipulated by a human operator, the tool and/or the gripper being connected to the distal-end element in such a way that the tool and/or the gripper has the same degrees of freedom as the distal-end element;
means for controlling at least part of the first chain of elements, comprising:
actuators arranged on the chain to perform all the movements of the various elements of the chain relative to one another and/or to apply a force between them,
means for measuring displacement of the elements with respect to one another,
a single multiaxis force sensor, arranged between the distal-end element and the tool and/or the gripper, so as to measure forces applied to the distal-end element and the tool and/or the gripper, and
a controller for controlling the actuators on the basis of the measurements taken by the means for measuring displacement and by the measurements from the multiaxis force sensor, according to a control law implemented in the controller,
said control law comprising:
a force-increasing loop configured to amplify, at joints of the robot, forces applied to the tool and/or the gripper and measured by the multiaxis force sensor, this being in respect of at least some of the degrees of freedom of the distal end, the force-increasing loop comprising a comparator to subtract, from an integral gain Ki of the loop, an anti-windup gain $K_{aw}$, and an integrator which receives a result from the comparator to supply setpoint speeds for the various elements of the chain, an internal speed loop with proportional gain Kv which receives the speed setpoint from the force-increasing loop to supply non-saturation reference torques for the various actuators, an internal speed loop saturation function, a saturation term $\tau_{sat}$ being chosen to be greater than or equal to a vector $\tau_{f0}$ of dry friction coefficients of the actuators, and an anti-windup component fed back to an input of the integrator of the force-amplification loop, and obtained from a force correction applied by the saturation function and the gain Kaw so that as soon as saturation comes into effect, the integrator of the force-increasing loop interrupts its integration.

2. The co-handling robot as claimed in claim 1, wherein the anti-windup gain Kaw is equal to $Kv^{-1}$.

3. The co-handling robot as claimed in claim 1, wherein the saturation term $\tau_{sat}$ is equal to the sum of the vector $\tau_{f0}$ plus twice the value of uncertainty thereon.

4. The co-handling robot as claimed in claim 1, wherein the actuators are configured to be controlled directly by the controller, the saturation function being applied directly at an output of the internal speed loop.

5. The co-handling robot as claimed in claim 1, wherein the actuators are not configured to be controlled by force directly, forces $\tau_m$ applied by the actuators then being measured and considered in calculation of the saturation term $\tau_{sat}$.

6. The co-handling robot as claimed in claim 1, wherein the actuators comprise servomotors.

7. The co-handling robot as claimed in claim 1, wherein the means for measuring the displacement of the elements with respect to one another comprise absolute-position sensors.

8. The co-handling robot as claimed in claim 1, wherein the controller is configured to implement at least one additional control law selected from control with programmable virtual mechanical constraints, control with cartesian and/or joint speed limits, control with restriction of the workspace, remote-operation control with or without force feedback.

9. The co-handling robot as claimed in claim 1, wherein the multiaxis force sensor is arranged between a handle of the tool and the tool, so as to measure only forces applied to the handle.

10. The co-handling robot as claimed in claim 1, wherein the means for controlling at least part of the first chain of elements further comprises means for measuring forces applied by the actuators, and the controller is configured to control the actuators based on measurements taken by the means for measuring the forces applied by the actuators.

11. A method of using the co-handling robot as claimed in claim 1, the method comprising:

using the co-handling robot as a robot to assist with a surgical intervention or as a robot for assembling or handling heavy loads, or as a lead-through programmed robot.

* * * * *